(12) United States Patent
Hossepian

(10) Patent No.: US 10,356,277 B1
(45) Date of Patent: Jul. 16, 2019

(54) SYSTEMS, PROCESSES, AND COMPUTER PROGRAM PRODUCTS FOR CONTROL OF GUTTER CREEP

(71) Applicant: KYOCERA Document Solutions Inc., Osaka (JP)

(72) Inventor: Nishan Hossepian, Torrance, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/954,068

(22) Filed: Apr. 16, 2018

(51) Int. Cl.
- H04N 1/00 (2006.01)
- G06F 3/12 (2006.01)
- H04N 1/393 (2006.01)
- H04N 1/387 (2006.01)

(52) U.S. Cl.
CPC ........... H04N 1/393 (2013.01); G06F 3/1208 (2013.01); G06F 3/1219 (2013.01); G06F 3/1243 (2013.01); G06F 3/1252 (2013.01); H04N 1/00726 (2013.01); H04N 1/00779 (2013.01); H04N 1/3872 (2013.01)

(58) Field of Classification Search
CPC .............................. H04N 1/393; G06F 3/1208
See application file for complete search history.

(56) References Cited

U.S. PATENT DOCUMENTS

| | | | | |
|---|---|---|---|---|
| 5,191,623 A | * | 3/1993 | Moriya | .................... H04N 1/38 358/451 |
| 2004/0205603 A1 | * | 10/2004 | Nguyen | ................ G06F 17/211 715/234 |
| 2008/0117458 A1 | | 5/2008 | Pyo et al. | |
| 2008/0151322 A1 | * | 6/2008 | Morales | ................ H04N 1/387 358/448 |
| 2014/0085645 A1 | | 3/2014 | Okazaki | |

* cited by examiner

*Primary Examiner* — Ibrahim Siddo
(74) *Attorney, Agent, or Firm* — L/O Alexis J Saenz

(57) ABSTRACT

A system and method provide an improvement to publications with gutter creep that shifts page content to the edges of pages, if not off the page entirely. In an exemplary embodiment, a process may be triggered which determines a printable page area for pages of each respective sheet that will be printed on, based on the sheet gutter value for the page. A scaling factor is applied to the printable page area to produce a scaled printable area. The printed content may be scaled within the printable area by the scaling factor so that when the gutter creep value becomes larger and there is less printable area available, the content remains readable on the page.

20 Claims, 7 Drawing Sheets

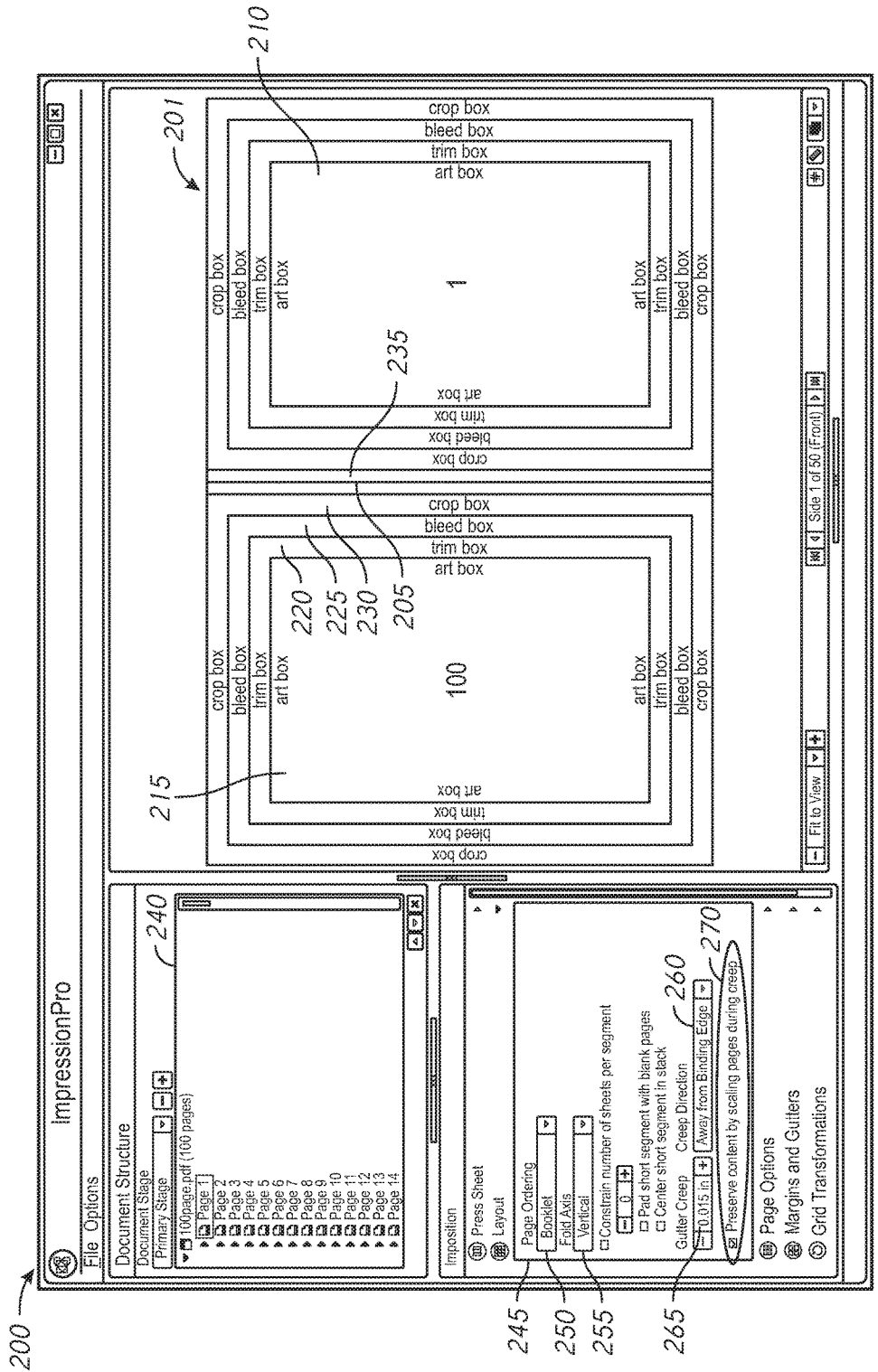

SYSTEMS, PROCESSES, AND COMPUTER PROGRAM PRODUCTS FOR CONTROL OF GUTTER CREEP

CROSS-REFERENCE TO RELATED APPLICATION

None.

FIELD

The subject disclosure relates to image processing and more particularly to systems, processes, and computer program products for control of gutter creep.

BACKGROUND

During some print jobs, for example, booklet imposition scenarios, it is often required to maintain a progressive margin along the folding axis to account for the increasing size of the booklet "spine" as pages are added to the folding stack. This is known as "gutter creep" or "signature shift". Logical page content must be shifted away from the ever-increasing spine thickness in order to maintain content visibility. If there is significant weight to the paper or the number of folded sheets in a given booklet segment is high, the content may end up being shifted off the left and right ends of the folded sheet.

As can be seen, there is a need to improve on the positioning of page content for print jobs with a substantial amount of gutter creep.

SUMMARY

In one aspect of the disclosure, a method of controlling gutter creep in a print job for a printed publication comprising a plurality of sheets, by a computer processor, comprises receiving a number of sheets value for the plurality of sheets, that will be used to print pages in the printed publication; determining a sheet gutter value for each sheet; determining a printable page area for pages of each respective sheet that will be printed on, based on the sheet gutter value; determining a scaling factor for the determined printable page area of each respective page being printed on, to produce a scaled printable area; scaling printed content within the scaled printable area by the scaling factor for the page being printed on, for each respective sheet; and positioning scaled printed content of respective sheets within the determined printable page areas of respective sheets.

In another aspect, a computer program product to control gutter creep in a print job for a printed publication comprising a plurality of sheets, comprises a non-transitory computer readable storage medium having computer readable program code embodied therewith. The computer readable program code is configured, when executed by a processor, to: receive a number of sheets value for the plurality of sheets, that will be used to print pages in the printed publication; determine a sheet gutter value for each sheet; determine a printable page area for pages of each respective sheet that will be printed on, based on the sheet gutter value; determine a scaling factor for the determined printable page area of each respective page being printed on, to produce a scaled printable area; scale printed content within the scaled printable area by the scaling factor for the page being printed on, for each respective sheet; and position scaled printed content of respective sheets within the determined printable page areas of respective sheets.

In yet another aspect, an image rendering computing device comprises a memory module; an input/output port; and a processor in communication with the memory module and the input/output port. The processor is configured, via a set of executable instructions stored in the memory module, to: receive through the input/output port a request to print a print job comprising a plurality of sheets to be assembled into a printed publication, retrieve from the memory module, a file including a plurality of sheets comprising the print job, each sheet comprising at least one page to be printed on, receive a number of sheets value for the plurality of sheets, determine a sheet gutter value for each sheet, determine a printable page area for pages of each respective sheet that will be printed on, based on the sheet gutter value, determine a scaling factor for the determined printable page area of each respective page being printed on, to produce a scaled printable area, scale printed content within the scaled printable area by the scaling factor for the page being printed on, for each respective sheet, position scaled printed content of respective sheets within the determined printable page areas of respective sheets, and print each sheet with the positioned scaled printed content within the determined printable page areas of respective sheets.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 2B is a screenshot of the user interface of FIG. 2A after page content scaling adjustment is applied in accordance with embodiments of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

As will be appreciated, embodiments disclosed below may be practiced in and have industrial applicability to the general fields of image rendering and printing.

Figure 2A:
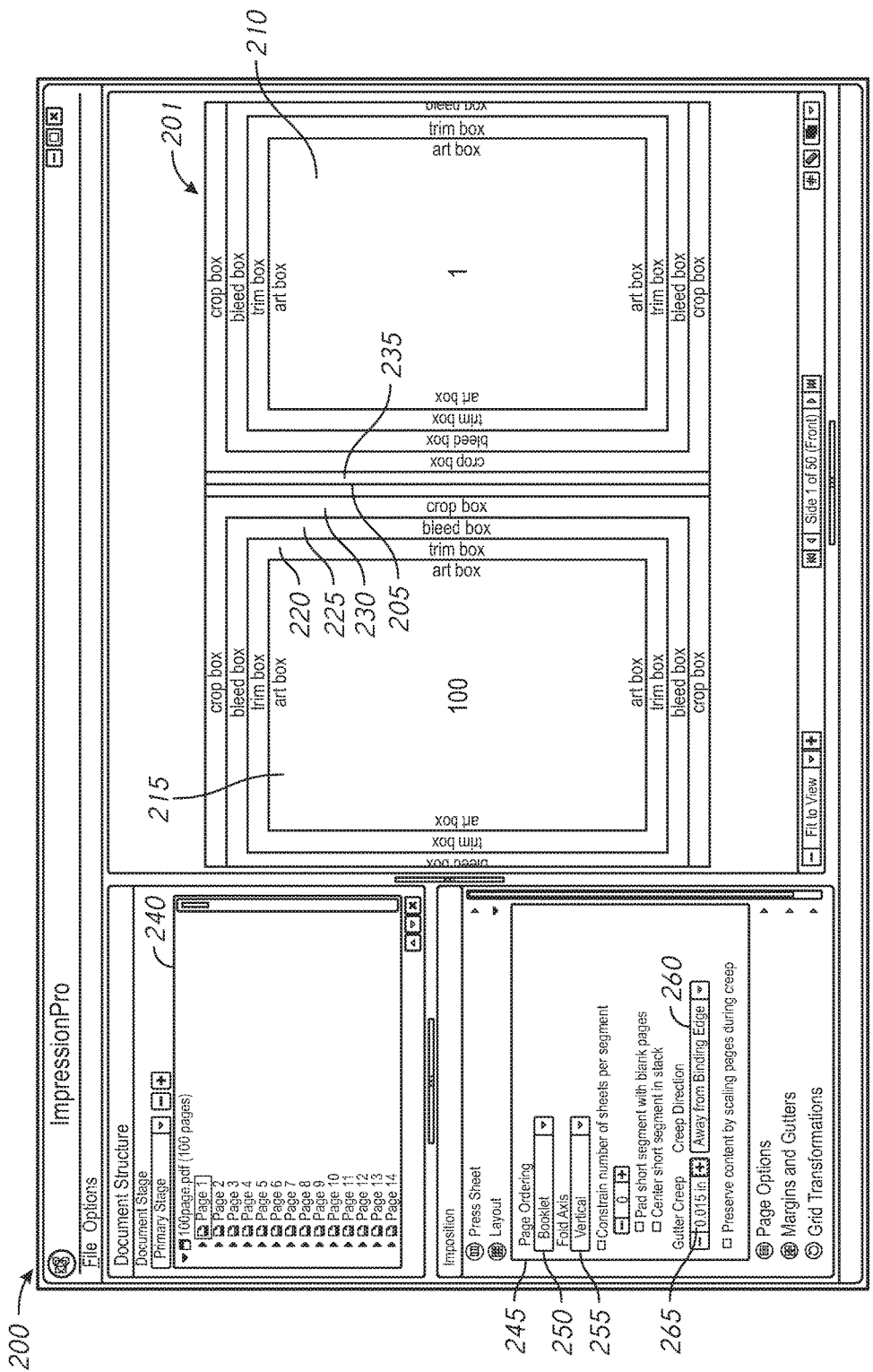
FIG. 2A is a screenshot of a user interface for a multi-page print job along a vertical fold axis before page content scaling adjustment is applied in accordance with embodiments of the subject technology.
Figure 3A:
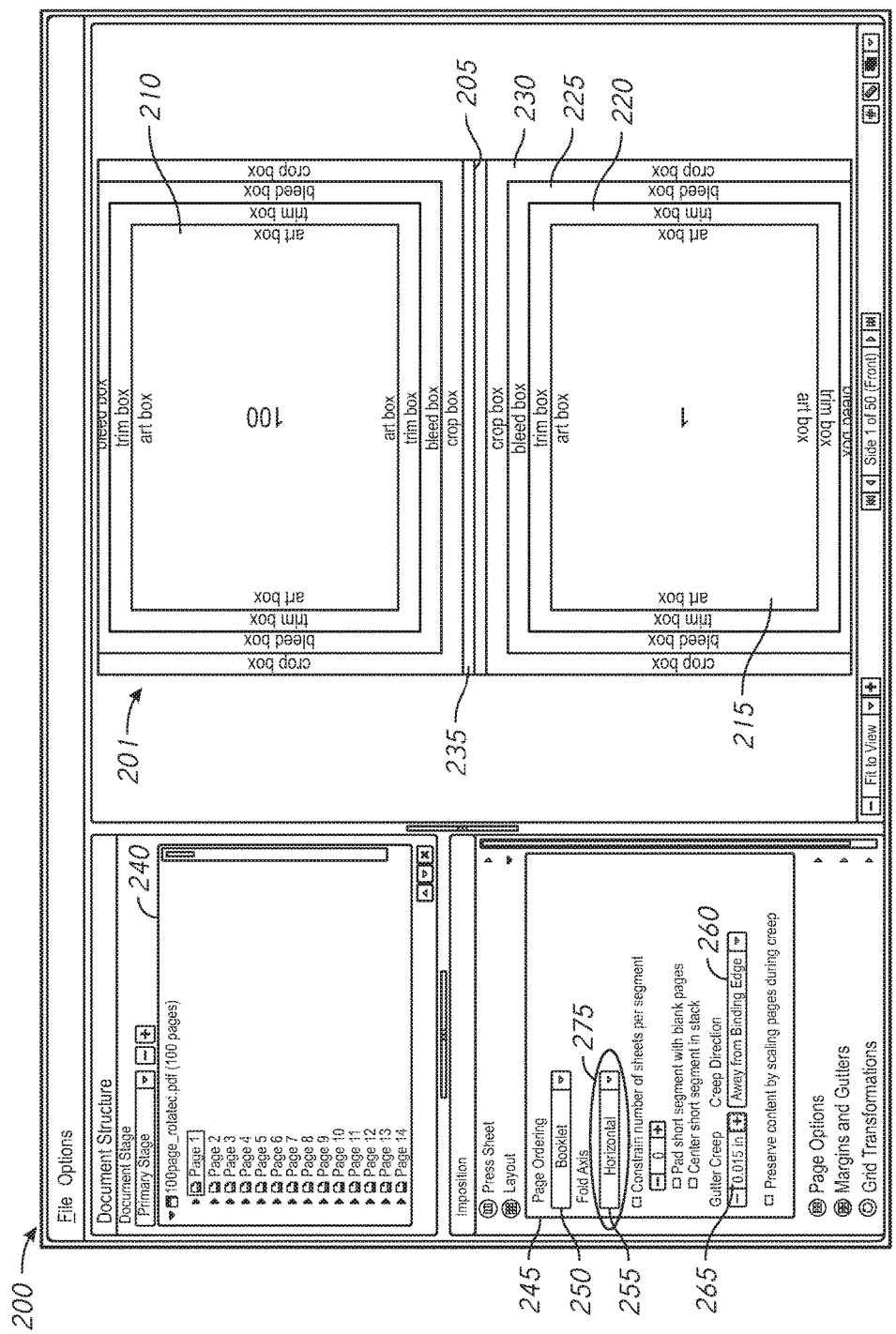
FIG. 3A is a screenshot of a user interface for a multi-page print job along a horizontal fold axis before page content scaling adjustment is applied in accordance with embodiments of the subject technology.

Generally, embodiments of the subject technology invention provide computer implemented methods that allow multiple print jobs being assembled into a multi-page publication to account for gutter creep without losing page content. As discussed above, conventional approaches to gutter creep shift page content away from a fold axis toward the edge margins. FIGS. 2A and 3A (described below) show examples of print areas partially or wholly shifted off a page space. In an exemplary embodiment, a scaling factor may be applied to a page so that the page content shrinks in size as the sheet gutter value increases. As will be appreciated, aspects of the disclosure below (shown for example in FIGS. 2B and 3B), maintain the page content in view while preventing print areas from being shifted off the page space.

As used below, a "page space" may refer to a sheet of paper or a digital representation of a sheet. Generally speaking, the "page space" may refer to the available printing area onto which page content (for example, text or graphics) may be placed and fit within the borders for a size of paper. In some embodiments, the digital representation of the page space may exist as a digital file to be transferred between computing devices and displayed on an electronic display. The page space may in some embodiments exist as an electronic file whose display shows the positioning of print job image objects under the embodiments disclosed below or may be rendered onto a recording medium such as paper (or another tangible substrate onto which an image object may be rendered) as described further below. Similarly, a "page" generally refers to the "logical page" or the "page element" being placed. As discussed below, a "logical page" may be a user defined area of the printing area. A "page element" may be some object imposed onto the logical page space. A "sheet" may sometimes refer to a "sheet face", which is either the front or back half of the digital area or physical medium that is receiving the page element. An "image object" or "image" may be for example, text or graphics. In general, a "print job" may refer to a single image, a page with multiple images contained within its borders, or multiple pages with a combination of the aforementioned image(s). As used below, a "print job" may sometimes be referred to as an image object since the rendering of the print job is shown as an image within the page space. As "print jobs" are requested, aspects of the embodiments disclosed may compile multiple "print jobs" into a single overall "print job", "print project", or "print publication" laid out onto a sheet or series of sheets that will be assembled into an overall publication. In an exemplary embodiment, a print job will be described in the context of a multi-page document forming for example, a codex, calendar, or other publication type with sheets divided by a central fold axis defining pages on either side of the fold axis.

For the following flowchart, steps of the processes may be referred to as blocks and/or by reference numeral shown in parentheses. As will be described further below, steps may be performed by a machine, for example, a computing device, an image forming apparatus, and/or a processing unit. While the steps may be described in one order, it will be understood that variations to the order may be practiced or the order in which claims below are written may vary from the following without departing from the scope of the invention.

Figure 1:
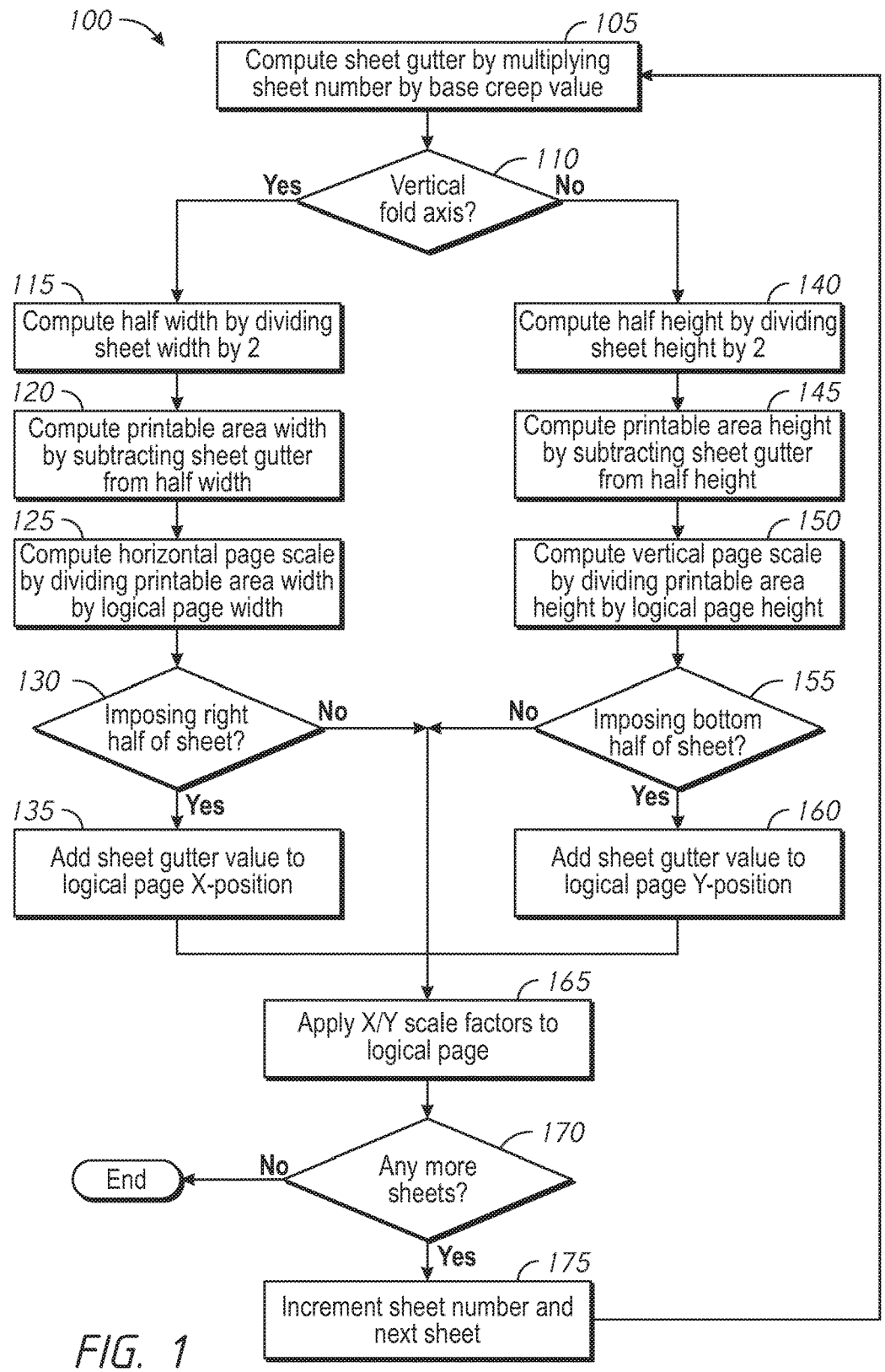
FIG. 1 is a flowchart of a method of adapting page content within page space of a multi-page print job to account for gutter creep in accordance with an embodiment of the subject technology.

Referring now to FIG. 1, a method 100 of adapting page content within page space of a multi-page print job to account for gutter creep is shown according to an exemplary embodiment. An example of print jobs that implement aspects of the following method 100 may be seen in FIGS. 2A, 2B, 3A, and 3B, which show user interfaces displaying a print preview of a multi-page publication. The method 100 is in some embodiments an iterative process that repeats the steps for each sheet in the print job so that gutter creep is accounted for from the first sheet forming the first and last pages of a document to the last sheet forming the center pages of the document.

For a multi-page document, the method 100 may begin by computing 105 a sheet gutter value for the document. The sheet gutter value may be based on for example, the number of pages in the print job multiplied by a base creep value that progresses for each sheet. Thus, each sheet may have a unique sheet gutter value (shared by pages on the same sheet). The method 100 may continue by determining 110 whether the document includes a vertical fold axis. For purposes of the print job projects contemplated, it will be understood that print jobs may be defined by either a vertical fold or a horizontal fold type publication. Documents with a vertical fold axis will be described by proceeding down the left side of the flowchart while documents with a horizontal axis will be described proceeding down the right side of the flowchart.

For vertical fold axis type print jobs, the method 100 may continue by computing 115 a half width value for the sheet by dividing the sheet width in half. The half width value may be constant for each sheet throughout the print job. Generally, embodiments contemplate one page per sheet half (although some variations may exist). The printable area width for a page may be calculated 120 by subtracting the sheet gutter value for the page from the page half width value. In an exemplary embodiment, a scaling factor may be applied 125 to the page. For pages with a vertical fold axis, a horizontal page scale value may be determined by dividing the printable area width by the logical page width. The logical page width (or height, as the case may be) is the size of the imposed page element. For example, as depicted in FIG. 2A, the logical page width is set to the crop-box 230. However, the logical page width may be any of the other boxes as well (bleed, trim or art box). The desired "size" to use is dependent upon a selectable option in the user-interface. In some embodiments, a determination 130 may be made that checks if the right half of the sheet being printed on is being imposed (for example, whether a page element is being placed on the right-half of the sheet. If the text will be imposing on the right half of the page being printed on, the method may add 135 the sheet gutter value to the logical page's X-position, shifting the position of the print job for the page away from the fold axis. In an exemplary embodiment, the method may apply 165 the scale factor to the logical page. For a vertical fold axis, as described above, this is a horizontal scale factor. The print job content (text and/or graphics) may thus be scaled according to the scale factor for the selected page at printing.

As will be appreciated, the steps above for vertical fold axis jobs may be modified for horizontal fold axis jobs. For horizontal fold axis type print jobs, the method 100 may after the determination at step 110, compute 140 a half height value for the sheet by dividing the sheet height in half. The half height value may be constant for each sheet throughout the print job. The printable area height for a page may be calculated 145 by subtracting the sheet gutter value for the page from the page half height value. In an exemplary embodiment, a scaling factor may be applied 150 to the page. For pages with a horizontal fold axis, a vertical page scale value may be determined by dividing the printable area height by the logical page height. In some embodiments, a determination 155 may be made that checks if a page element is being placed on the bottom half of the sheet being printed (being imposed on). If the text will be imposing on the bottom half of the page being printed on, the method may add 160 the sheet gutter value to the logical page's Y-position, shifting the position of the print job for the page away from the fold axis. In an exemplary embodiment, the method may apply 165 the scale factor to the logical page. For a horizontal fold axis, as described above, this is a vertical scale factor. The print job content (text and/or illustrations) may thus be scaled according to the scale factor for the selected page at printing.

The method 100 may make a determination 170 to check if anymore sheets remain in the overall print job. For any remaining sheets, the method 100 returns back to step 105 and reiterates the process according to the type of fold axis being implemented.

FIGS. 2A and 2B show an example of a user interface (UI) 200 that includes a software embodiment for implementing features of the above described processes. FIGS. 2A and 2B show in general a page layout 201 for a 100 page (50 sheet) print job publication. The UI 200 may include in some embodiments, a print preview area for displaying the page layout 201. As will be understood, the print preview area shows proposed positioning of elements for the print job being laid out. For sake of illustration, elements in the page layout are pointed to only once but it will be understood that each page may mirror the features in the layout of the opposing page. In an exemplary embodiment, the page layout may display proposed positioning of a fold axis 205 with gutter areas 235 on both sides of the axis 205. Page content 210 (which may be text and/or graphics) may be primarily centered in the area outlined by art box 215. However, some page content (or other printed material such as bleeds or crop marks) may be included in surrounding areas of the page's printable area. Surrounding the art box 215 maybe a trim box area 220, which may be surrounded by a bleed box area 225, which may be surrounded by a crop box area 230.

A control panel in the UI 200 may include for example, a document structure window 240 which displays the document stage and includes a page selection feature. For purposes of illustration, the window 240 shows that page number "100" (along with its opposing page number "1") is selected for preview in the page layout 201. In an exemplary embodiment, a page imposition window in the UI may include a page layout control window 245. The control window 245 may include a page ordering selection 250 for selecting a publication type (for example, booklet, calendar, etc.). A fold axis selection button 255 may allow the user to select the axis type (for example, vertical or horizontal). In an exemplary embodiment, the control window 245 may include a button 260 that controls the creep direction of the proposed print job. A button 265 may control a gutter creep value which represents the distance of gutter creep (gutter space 235) applied to the proposed positioning of page content relative to the fold axis 205.

Referring solely to FIG. 2A for the moment, it can be seen that some print jobs include a page size that impacts the positioning of the page content and affects the content visibility. As may be appreciated, the page layout 201 in FIG. 2A shows how certain areas of the print job become lost or reduced by the size of the print job as the gutter creep value increases. On the right edge of page number "100" and the left edge of page number "1", the crop box area 230 content is completely lost. Similarly, the content of the bleed box area 225 is partially removed from visibility.

Referring now to FIG. 2B, the UI 200 is shown with a selectable content scaling feature 270. FIG. 2B includes all the same features as FIG. 2A except that the selectable content scaling feature 270 is highlighted and shown as selected. The selectable content scaling feature 270 may invoke one or more of the steps in the process described in method 100 of FIG. 1. Triggering the selectable content scaling feature 270 applies a scaling factor to the page content 210 so that as the gutter creep value increases, the page content 210 may be scaled down (or vice versa). As shown in FIG. 2B, the art box 215 is scaled down. Some embodiments may apply the scaling factor to one, two, or more elements of the page layout 201 so that any of the areas 215, 220, 225, and/or 230 may be scaled down so none of the page content or at least user determined page content is not lost (for example, a user may elect to not scale down the bleed box area 225 at the expense of losing the crop box area 230).

Figure 3B:
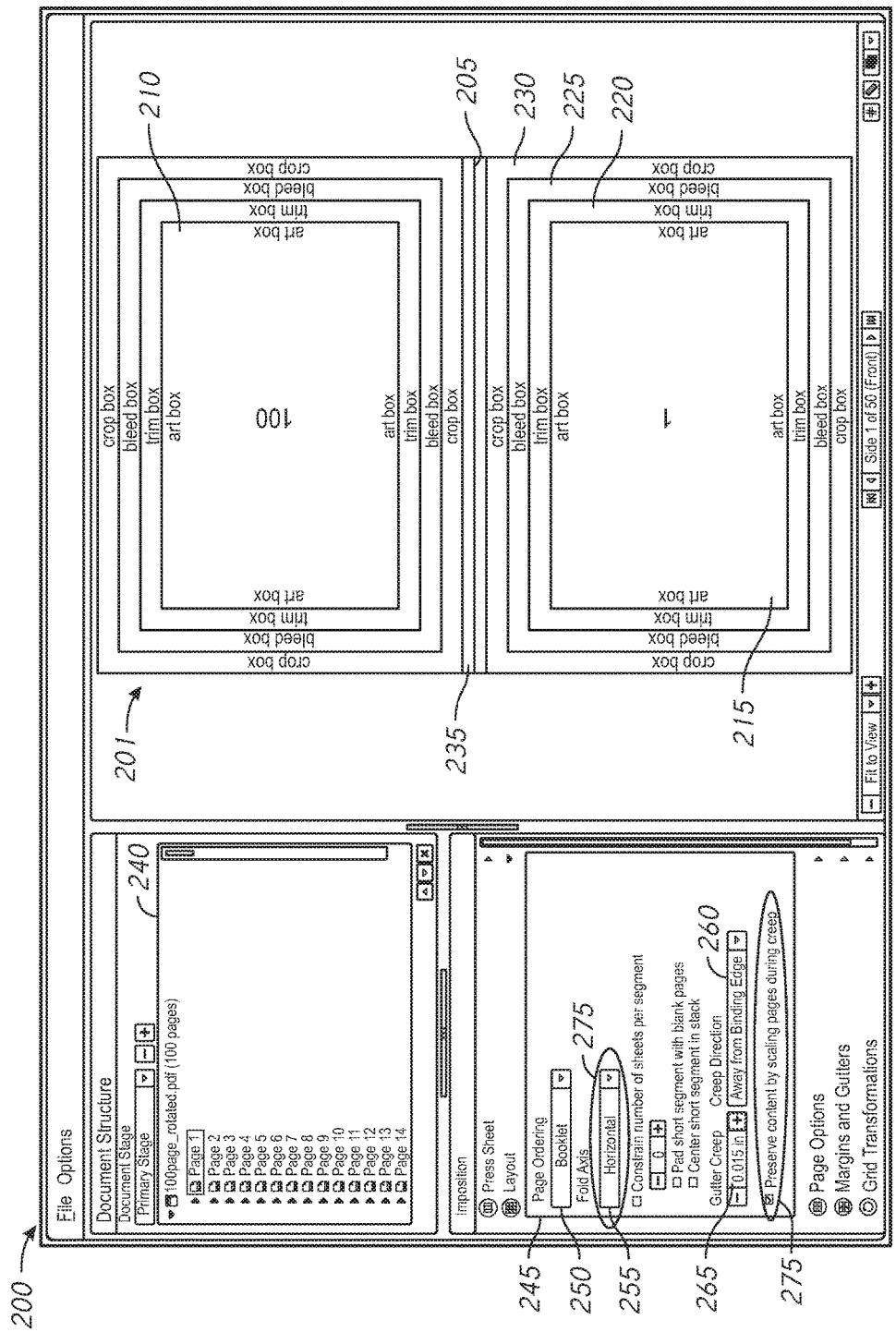
FIG. 3B is a screenshot of the user interface of FIG. 3A after page content scaling adjustment is applied in accordance with embodiments of the subject technology.

Referring now to FIGS. 3A and 3B, the UI 200 is shown again and is similar to the embodiment shown in FIGS. 2A and 2B except that the fold axis button 255 is shown with a horizontal axis selection 275 being implemented. As a result, the fold axis 205 is shown oriented horizontally on the page layout 201. In FIG. 3A, once again the crop box area 230 content is completely lost and similarly, the content of the bleed box area 225 is partially removed from visibility but this time along the top and bottom edges of the layout 201. FIG. 3B shows the result of page content scaling being applied when the selectable content scaling feature 270 is selected.

Figure 4:
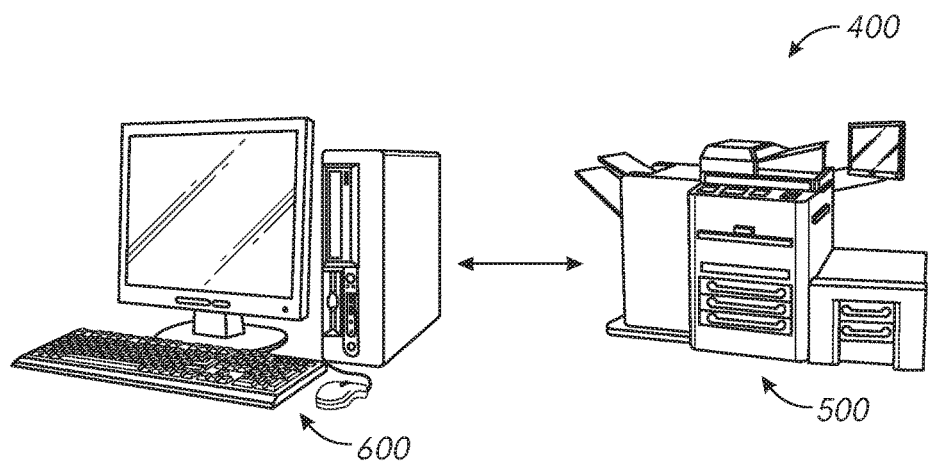
FIG. 4 is a schematic of a print job system in accordance with an embodiment of the subject technology.
Figure 5:
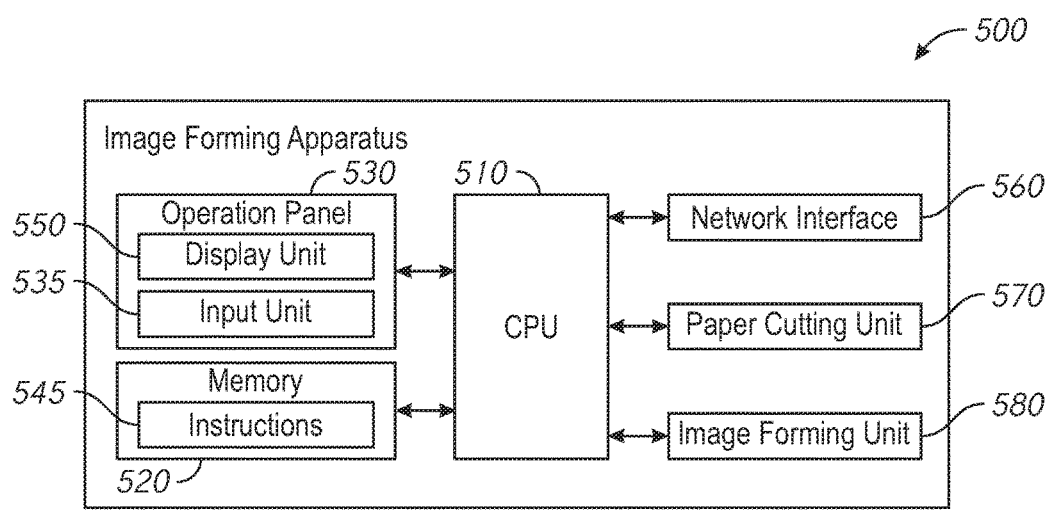
FIG. 5 is a block diagram of an image forming apparatus in accordance with an embodiment of the subject technology.
Figure 6:
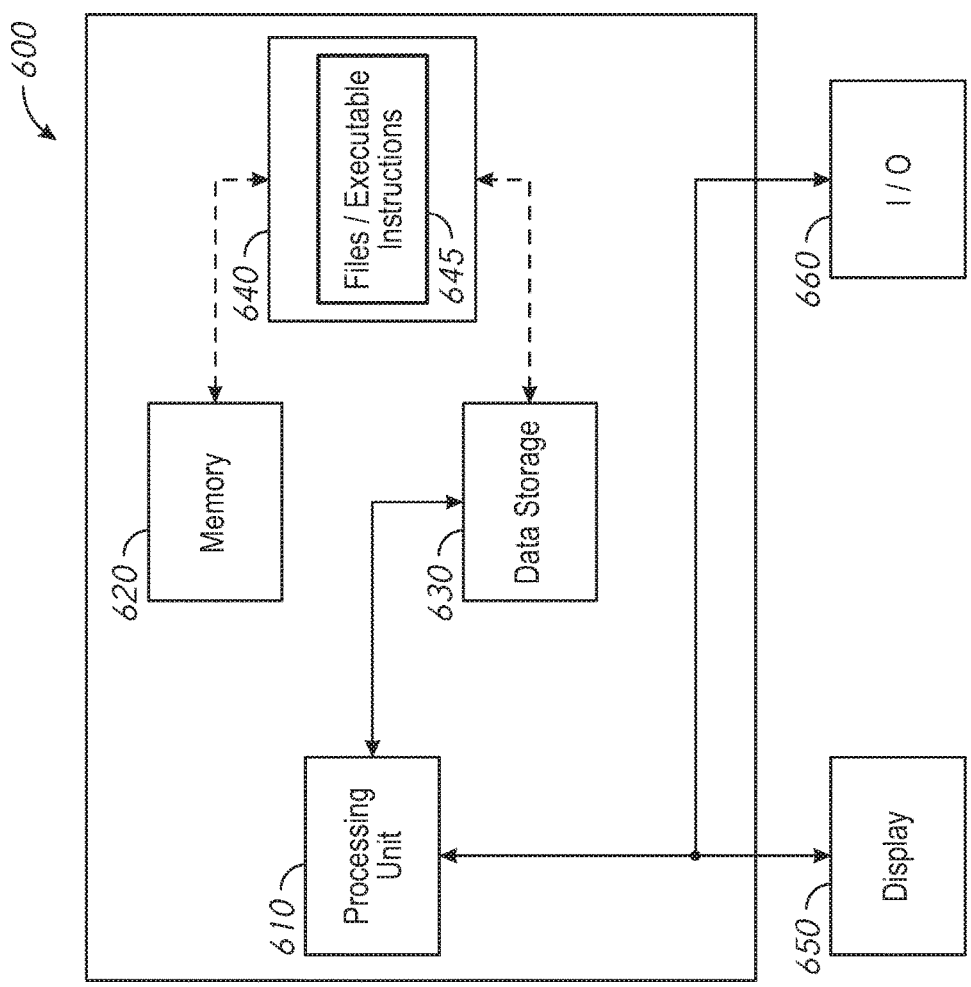
FIG. 6 is a block diagram of a computing device in accordance with an aspect of the subject technology.

Referring now to FIGS. 4-6, system and machines of the subject technology are shown according to exemplary embodiments. A system 400 is shown in FIG. 4 which may include an image forming apparatus 500 connected to a computing device 600. In some embodiments, the above described process(es) may be loaded as executable instructions into one or both of the image forming apparatus 500 and the computing device 600. FIG. 5 shows a schematic example of the image forming apparatus 500. FIG. 6 shows a schematic example of a computing device 600. In general, the process(es) above may be implemented by either or both the image forming apparatus 500 and the computing device 600. In addition, it will be understood that multiple instances of the computing device 600 may be connected to the same image forming apparatus 500, however, for sake of illustration, a single computing device 600 is shown. In some embodiments, the image forming apparatus 500 and/or the computing device 600 may include software embodiments, which may provide the digital preview of print sheets with pages laid out according to the embodiments described above. The preview may be saved as a file which may be stored, transferred, and recalled for future print requests.

The image forming apparatus 400 may be for example, a computing based image processing and printing device that can receive print job requests (for example, a printer, a fax machine, a copier machine). The components of the image forming apparatus 500, may include, but are not limited to, one or more processors or processing units 510, a system memory 520, an operation panel 530, an input unit 535, a set of program modules 545 including files and executable instructions, a display unit 550, a network interface 560, a paper cutting unit 570, an image forming unit 580, and a bus system that couples various system components including the system memory 520 to the processor(s) 510. The memory storage 520 may store for example, executable instructions and/or electronic versions of the image objects to be printed. In some embodiments, the processors 510 may include a processing unit dedicated to graphics and image processing (for example a graphics processing unit (GPU) or visual processing unit (VPU). As a GPU or VPU, the processor 510 may implement executable instructions focused on image processing applications (like those related to rendering the image objects into print jobs on the page space described above) either alone or in coordination with other general processor 510 types such a CPUs, microchips, and the like.

The computing device 600 may be for example, a computer system or a computer server. In some embodiments, the image forming apparatus 500 may be another example of a computing device 600. As will be appreciated, some aspects of the embodiments disclosed above may turn the computing device 600 into a special purpose computer system. For example, in the role of a host server, the computing device 600 may implement for example the functions of storing electronic image object files with connected users and their workstations. More particular to this disclosure, as a host server, the computing device 600 may receive and store print job requests and scale page onto a print sheet according to the process(es) described above. In the role of a user device, the computing device 600 is generally not a server but may instead be desktop computers, tablet or laptop computers, all-in-one computer stations, a mobile computing device (for example, a smart phone, smart wearable devices (glasses, jewelry, watches, ear wear, etc.), or programmable electronics.

The components of the tablet or laptop computers, may include, but are not limited to, one or more processors or processing units 610, a system memory 620, data storage 630, a computer program product 640 having a set of program modules 645 including files and executable instructions, and a bus system that couples various system components including the system memory 620 to the processor(s) 610. The memory storage 620 may store for example, electronic files of the image objects to be printed. In some embodiments, the processors 610 may include a processing unit dedicated to graphics and image processing (for example a graphics processing unit (GPU) or visual processing unit (VPU). As a GPU or VPU, the processor 610 may implement executable instructions focused on image processing applications (like those related to converting unrendered image content data described above) either alone or in coordination with other general processor 610 types such a CPUs, microchips, and the like.

The computing device 600 may be described in the general context of computer system executable instructions, such as the program modules 645 which represent a software embodiment of the system and processes described generally above with respect to FIG. 1. The program modules 645 generally carry out the functions and/or methodologies of embodiments as described above. The computing device 600 may typically include a variety of computer system readable media. Such media could be chosen from any available media that is accessible by the computing device 600, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 620 could include one or more computer system readable media in the form of volatile memory, such as a random-access memory (RAM) and/or a cache memory. By way of example only, the data storage system 630 may read from and write to a non-removable, non-volatile magnetic media device. The system memory 620 may include at least one program product 640 having a set (e.g., at least one) of program modules 645 that are configured to carry out the functions of embodiments of the invention in the form of computer executable instructions. The program product/utility 640, having a set (at least one) of program modules 645, may be stored in the system memory 620 by way of example, and not limitation, as an operating system, one or more application programs, other program modules, and program data. Some embodiments may generate an electronic user interface (viewable and controllable from the display unit 550 or display 650) that may allow the user to enter image objects for processing and in some embodiments, control and manipulate the positioning of image objects onto a print sheet (even though embodiments are generally considered automated and positioning may primarily be performed by the processing unit(s) 510 and/or 610).

The computing device 600 may communicate with one or more external devices including for example, an electronic display 650 which may in some embodiments be configured for tactile response as in a touch screen display. User input into the display 650 may be registered at the processor 610 and processed accordingly. Other devices may enable the computing device 600 to communicate with one or more other computing devices, either by hardwire or wirelessly. Such communication can occur via Input/Output (I/O) interfaces/ports 660. In some embodiments, the I/O interfaces/ports 660 may be specially configured to handle aspects of the embodiments described herein converting the computing device 600 into a special purpose machine. For example, as a printer, the I/O interfaces/ports 660 may be configured to transmit receipt of the image objects with their respective metadata for use in determining optimum positioning on a page space. The printer may be dedicated to printing and cutting jobs. The I/O interfaces/ports 660 may also include printing modules (for example, ink jet print heads, laser print systems, etc.) for rendering a physical embodiment of page sheet with image objects optimally positioned on the page space.

The computing device 600, through the I/O interface/ports 660, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 600 may be a cloud computing node connected to a cloud computing network (not shown). The computer computing device 600 may be practiced in distributed cloud computing environments where tasks are performed by remote processing devices that are linked through a communications network. In a distributed cloud computing environment, program modules may be located in both local and remote computer system storage media including memory storage devices. Thus, members contributing to for example, the overall system being developed described above may provide software modules to the computing device 600 which may hold electronic files and copies in more than one physical location, each of which may be referenced and/or may trigger automated processes (for example, once a threshold number of print job requests are received).

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 650 which may be controlled via direct contact with the display 650 or via the I/O interfaces 660 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 610 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of controlling gutter creep in a print job for a printed publication comprising a plurality of sheets, by a computer processor, comprising:
   receiving a number of sheets value for the plurality of sheets, that will be used to print pages in the printed publication;
   determining a sheet gutter value that changes based on a sheet value of a sheet being printed on;
   determining a printable page area for pages of each respective sheet that will be printed on, based on the changing sheet gutter value;
   determining a scaling factor that increases or decreases based on the changing sheet gutter value for each respective sheet, for the determined printable page area of each respective page being printed on, to produce a scaled printable area;
   scaling printed content within the scaled printable area by the scaling factor for the page being printed on, for each respective sheet; and
   positioning scaled printed content of respective sheets within the determined printable page areas of respective sheets.

2. The method of claim 1, wherein the sheet gutter value is based on the number of sheets value that will be used, multiplied by a base creep value.

3. The method of claim 1, wherein the scaling factor for each page being printed on is based on a ratio of a width of the determined printable page area to a width of the page being printed on.

4. The method of claim 1, wherein the scaling factor for each page is based on a ratio of a height of the determined printable page area to a height of the page being printed on.

5. The method of claim 1, wherein the scaled printable page area is positioned away from a central fold axis of each sheet by the sheet gutter value for each respective sheet.

6. The method of claim 5, wherein the determined printable page area is based on subtracting the gutter value of each sheet from half a width of each sheet.

7. The method of claim 6, wherein the central fold axis is a vertical fold.

8. The method of claim 5, wherein the determined printable page area is based on subtracting the gutter value of each sheet from half a height of each sheet.

9. The method of claim 8, wherein the central fold axis is a horizontal fold.

10. A computer program product to control gutter creep in a print job for a printed publication comprising a plurality of sheets, the computer program product comprising a non-transitory computer readable storage medium having computer readable program code embodied therewith, the computer readable program code being configured, when executed by a processor, to:
  receive a number of sheets value for the plurality of sheets, that will be used to print pages in the printed publication;
  determine a sheet gutter value that changes based on a sheet value of a sheet being printed on;
  determine a printable page area for pages of each respective sheet that will be printed on, based on the changing sheet gutter value;
  determine a scaling factor that increases or decreases based on the changing sheet gutter value for each respective sheet, for the determined printable page area of each respective page being printed on, to produce a scaled printable area;
  scale printed content within the scaled printable area by the scaling factor for the page being printed on, for each respective sheet; and
  position scaled printed content of respective sheets within the determined printable page areas of respective sheets.

11. The computer program product of claim 10, wherein the sheet gutter value is based on the number of sheets value that will be used, multiplied by a base creep value.

12. The computer program product of claim 10, wherein the scaling factor for each page being printed on is based on a ratio of a width of the determined printable page area to a width of the page being printed on.

13. The computer program product of claim 10, wherein the scaling factor for each page is based on a ratio of a height of the determined printable page area to a height of the page being printed on.

14. The computer program product of claim 10, wherein the scaled printable page area is positioned away from a central fold axis of each sheet by the sheet gutter value for each respective sheet.

15. The computer program product of claim 10, wherein the determined printable page area is based on subtracting the gutter value of each sheet from half a width or half a height of each sheet.

16. An image rendering computing device, comprising:
  a memory module;
  an input/output port; and
  a processor in communication with the memory module and the input/output port, the processor configured, via a set of executable instructions stored in the memory module, to:
    receive through the input/output port a request to print a print job comprising a plurality of sheets to be assembled into a printed publication,
    retrieve from the memory module, a file including a plurality of sheets comprising the print job, each sheet comprising at least one page to be printed on,
    receive a number of sheets value for the plurality of sheets,
    determine a sheet gutter value that changes based on a sheet value of a sheet being printed on,
    determine a printable page area for pages of each respective sheet that will be printed on, based on the changing sheet gutter value,
    determine a scaling factor that increases or decreases based on the changing sheet gutter value for each respective sheet, for the determined printable page area of each respective page being printed on, to produce a scaled printable area,
    scale printed content within the scaled printable area by the scaling factor for the page being printed on, for each respective sheet,
    position scaled printed content of respective sheets within the determined printable page areas of respective sheets, and
    print each sheet with the positioned scaled printed content within the determined printable page areas of respective sheets.

17. The image rendering computing device of claim 16, wherein the sheet gutter value is based on the number of sheets value that will be used, multiplied by a base creep value.

18. The image rendering computing device of claim 16, wherein the scaling factor for each page being printed on is based on a ratio of a width of the determined printable page area to a width of the page being printed on.

19. The image rendering computing device of claim 16, wherein the scaling factor for each page is based on a ratio of a height of the determined printable page area to a height of the page being printed on.

20. The image rendering computing device of claim 16, wherein the determined printable page area is based on subtracting the gutter value of each sheet from half a width or half a height of each sheet.

* * * * *